(12) United States Patent
Verbauwhede

(10) Patent No.: US 7,221,763 B2
(45) Date of Patent: May 22, 2007

(54) HIGH THROUGHPUT AES ARCHITECTURE

(75) Inventor: Ingrid Verbauwhede, Encino, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 838 days.

(21) Appl. No.: 10/132,788

(22) Filed: Apr. 24, 2002

(65) Prior Publication Data

US 2003/0202658 A1 Oct. 30, 2003

(51) Int. Cl.
*H04L 9/00* (2006.01)
*H04L 9/28* (2006.01)

(52) U.S. Cl. .......................... 380/277; 380/28; 380/37

(58) Field of Classification Search .................... None
See application file for complete search history.

(56) References Cited

U.S. PATENT DOCUMENTS

| 4,514,803 | A | * | 4/1985 | Agnew et al. ................ 703/26 |
| 5,748,741 | A | * | 5/1998 | Johnson et al. .............. 380/28 |
| 6,026,490 | A | * | 2/2000 | Johns-Vano et al. .......... 380/28 |
| 6,937,727 | B2 | * | 8/2005 | Yup et al. .................... 380/37 |
| 2002/0048364 | A1 | * | 4/2002 | Gligor et al. ................ 380/37 |
| 2002/0108048 | A1 | * | 8/2002 | Qi et al. ...................... 713/189 |
| 2002/0131588 | A1 | * | 9/2002 | Yang ........................... 380/37 |
| 2002/0191784 | A1 | * | 12/2002 | Yup et al. .................... 380/37 |
| 2003/0053623 | A1 | * | 3/2003 | McCanny et al. ........... 380/37 |
| 2003/0068036 | A1 | * | 4/2003 | Macchetti et al. ........... 380/29 |

OTHER PUBLICATIONS

Wayne Wolf, "Computers Components Principles of Embedded Computing System Design", Academic Press, 2001, p. 99.*
Trichina et al, "Supplement Cryptographic Hardware for Smart Cards", IEEE, Nov.-Dec. 2001, p. 26-35.*
Hardware Evaluation of the AES Finalists, Ichikawa et al., The Third Advanced Encryption Standard Candidate Conference, Apr. 13-14, 2000, New York.
An FPGA Implementation and Performance Evaluation of the AES Bloods Cipher Candidate Algorithm Finalists, Elbirt et al., The Third Advanced Encryption Standard Candidate Conference, Apr. 13-14, 2000, New York, pp. 1-15.

* cited by examiner

*Primary Examiner*—Kim Vu
*Assistant Examiner*—Ponnoreay Pich
(74) *Attorney, Agent, or Firm*—DLA Piper US LLP

(57) ABSTRACT

An advanced encryption system (AES) architecture includes a maximum parallel encryption module which implements one round of the AES algorithm in one clock cycle, and a maximum parallel key scheduling module which generates sub-keys in one clock cycle in parallel with the encryption module, thereby permitting feedback modes of operation to be used without adversely affecting AES throughput. A controller controls the operation of the encryption and key scheduling modules such that one round is completed per clock cycle. The controller is preferably part of a hierarchical distributed control scheme comprising communicating finite state machines (FSMs). The architecture also preferably includes asynchronous input and output buffers.

23 Claims, 7 Drawing Sheets

HIGH THROUGHPUT AES ARCHITECTURE

BACKGROUND OF THE INVENTION

1. Field of the Invention

This invention relates to the field of encryption systems, and particularly to advanced encryption standard (AES) architectures.

2. Description of the Related Art

The advanced encryption standard (AES) is a new encryption standard which implements the Rijndael algorithm. The Rijndael algorithm accepts data blocks and key sizes of 128, 192, or 256 bits; the AES implementation is a symmetric block cipher with 128 bit data blocks and a key size that can be chosen from 128, 192, or 256 bits.

Several possible implementation modes of the AES standard are shown in FIG. 1. The AES algorithm may be employed as an electronic code book (ECB) which receives plaintext (P) and produces an encrypted output (C). The algorithm may also be employed in one of several feedback modes of operation; such feedback modes include Cipher Block Chaining (CBC), Cipher Feedback (CFB), and Output Feedback (OFB).

Ideally, an implementation of the AES standard will have a high data rate. Several AES designs have been proposed to achieve a high data rate based on pipelined architectures. These work well when employing the AES algorithm as an ECB, with no feedback. However, the AES standard is most often used in the feedback modes of operation; in these modes, the output of the AES algorithm is fed back to the input. Unfortunately, this arrangement is incompatible with pipeline structures, due to the long latency of each pipeline path.

SUMMARY OF THE INVENTION

An AES architecture is presented which overcomes the problems noted above. High throughput is achieved, even when the AES algorithm is employed with one of the feedback modes of operation.

The present invention is a low latency, non-pipelined AES architecture. Hardware is provided for one encryption round, which is re-used as needed to complete the encryption process. This permits feedback modes to be used without adversely affecting AES throughput.

The present architecture requires a maximum parallel encryption module, which is arranged to implement one round of the AES algorithm in one clock cycle. It also requires a maximum parallel key scheduling module, arranged to generate sub keys in one clock cycle in parallel with the encryption module. The encryption and key scheduling modules are preferably made from combinatorial logic blocks, replicated as necessary to achieve one round per clock cycle.

A controller controls the operation of the encryption and key scheduling modules such that one round of the AES algorithm is completed per clock cycle. The controller is preferably part of a hierarchical distributed control scheme comprising communicating finite state machines (FSMs).

Further features and advantages of the invention will be apparent to those skilled in the art from the following detailed description, taken together with the accompanying drawings.

DETAILED DESCRIPTION OF THE INVENTION

Figure 1:
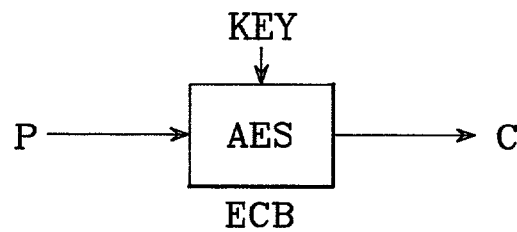
FIG. 1 is a diagram showing known implementations of various modes of operation used in combination with the AES algorithm.
Figure 1:
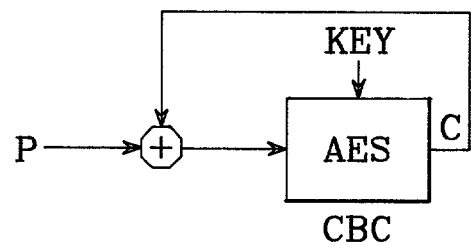
Figure 1:
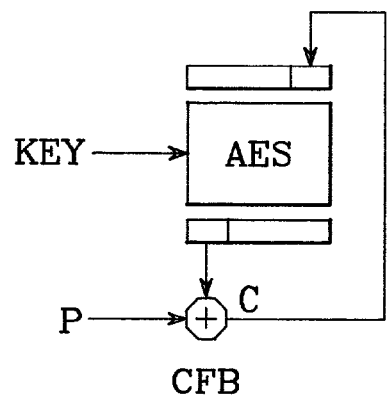
Figure 1:
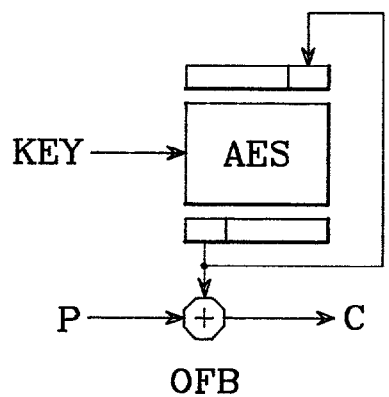
Figure 2:
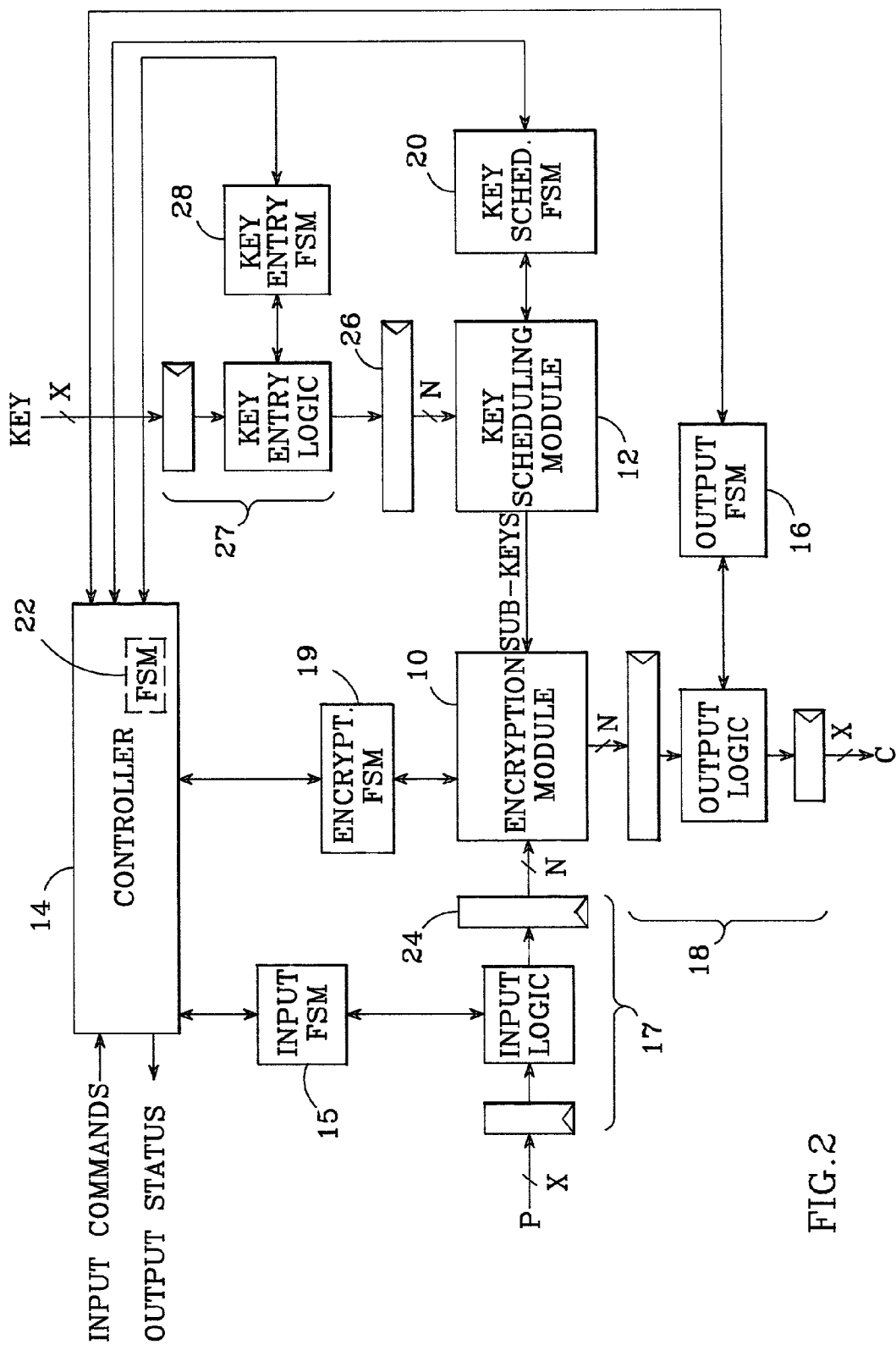
FIG. 2 is a block diagram of an AES architecture in accordance with the present invention.

An AES architecture in accordance with the present invention is shown in FIG. 2. When properly arranged, the present architecture provides high throughput, even with feedback modes of operation. At the heart of the architecture are an encryption module 10, a key scheduling module 12, and a controller 14. Encryption module 10 is made maximum parallel; i.e., all operations that can occur in parallel, do occur in parallel. This means that every bit of an N-bit data block is processed simultaneously through the encryption module. Thus, if the data block length N is chosen to be 256 bits, the encryption module receives and processes all 256 bits at once. Furthermore, the encryption module implements one round of the AES algorithm in one clock cycle.

The key scheduling module 12 is also made maximum parallel, such that the sub-keys required by encryption module 10 are generated in one clock cycle, in parallel with the encryption module.

Encryption module 10 and key scheduling module 12 are controlled via controller 14. The controller is adapted to operate encryption module 10 and key scheduling module 12 to perform one round of the AES algorithm in one clock cycle. Controller 14 is preferably part of a hierarchical distributed control scheme comprising communicating finite state machines (FSMs), such as an input FSM 15 and an output FSM 16 which control the operation of an input buffer 17 and an output buffer 18, respectively. The controller preferably also communicates with the outside world via input commands and output status bits. The control scheme preferably also includes FSMs 19 and 20, which control the operation of encryption module 10 and key scheduling module 12, respectively, and may be internal or external to their respective modules. Controller 14 preferably also includes an FSM 22; the controller's implementation is discussed in more detail in relation to FIG. 5, below.

The key is provided to key scheduling module 12 either via the input port and encryption module, or (as shown in FIG. 2) via a separate port; in either case, the key is stored in a key register 26. When the key is provided via a separate port, the system also includes a key entry buffer 27 which is controlled with its own FSM 28.

When arranged as described above, the present AES architecture provides low latency and high throughput, even when used with feedback modes of operation.

The architecture also preferably includes asynchronous input and output buffers, which implement a full handshake. Asynchronous input buffer 17 loads X-bit data bytes to be encrypted (P), places them in parallel in an N-bit internal register 24, and presents the N bits to the input of encryption module 10 simultaneously. Similarly, asynchronous output buffer 18 receives the N-bit output from encryption module 10 and outputs encoded X-bit data bytes (C) to an output bus. This arrangement decouples the external I/O operations, i.e., the loading and unloading of data, from the internal operation of the encryption core (modules 10 and 12). This allows the input and output busses to be any width compared to the internal input and output registers. Thus, the encryption core can be used in an environment in which the number of pins is limited (e.g., an 8-bit bus or a serial link), as well as with high speed parallel busses (e.g., 64, 128 or 256 bits). Another benefit afforded by the preferred asynchronous input and output buffers is that they enable a slow input and/or output to still be combined with fast internal operation, with the handshaking stretched over a large number of clock cycles to accommodate the slow interface.

Figure 3:
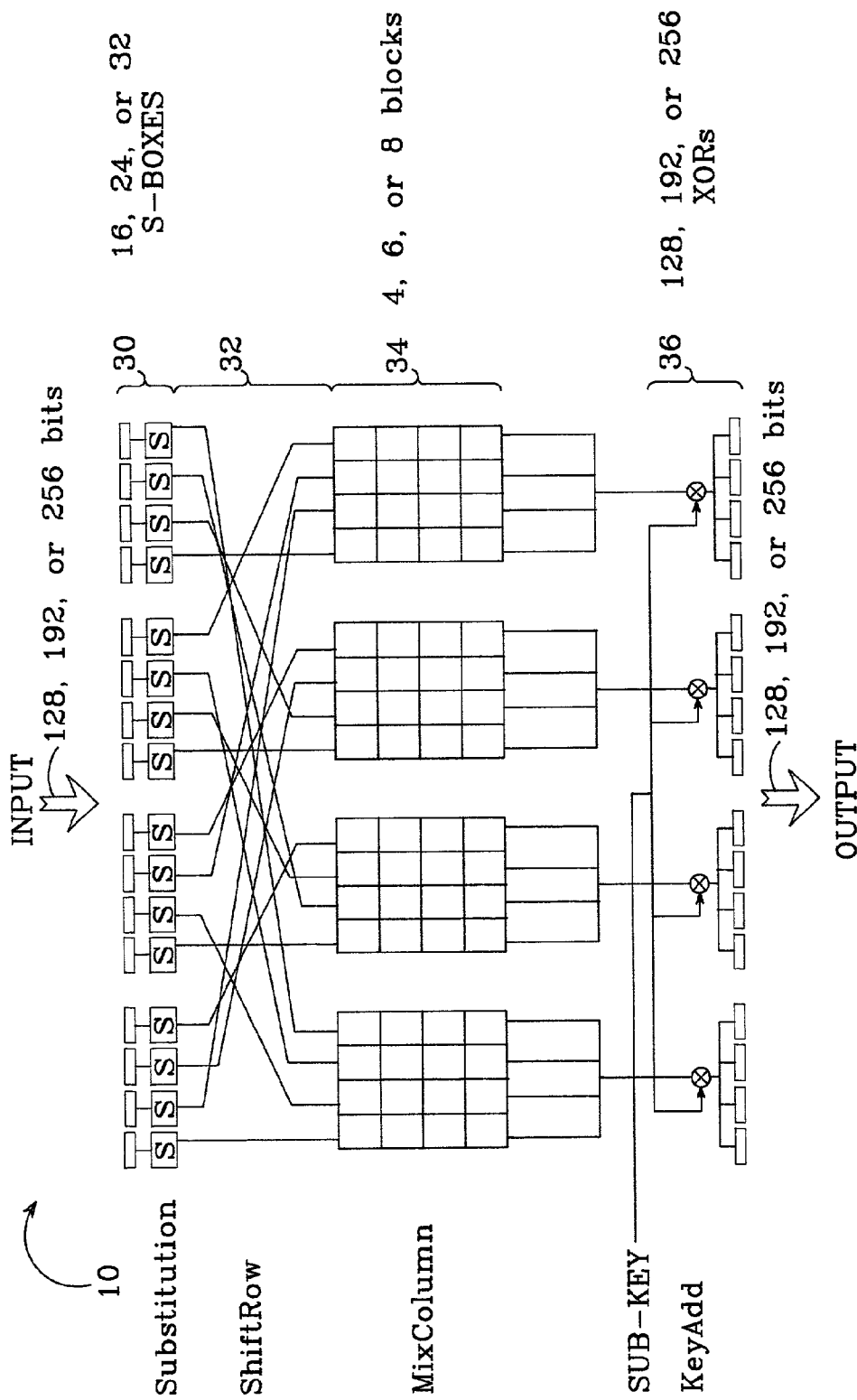
FIG. 3 is a block diagram of a maximum parallel encryption data path in accordance with the present invention.

One possible implementation for encryption module 10 is shown in FIG. 3. The module includes four different sub-modules: a substitution sub-module 30, a shift row sub-module 32, a mix column sub-module 34, and a key addition sub-module 36; the functionality of each sub-module is defined in the AES standard. To achieve high throughput and low latency, the sub-modules are preferably implemented with combinatorial logic and lookup tables, and the data path is made wide enough to accommodate the entire data block length of 128, 192, or 256 bits. The data path may be wider than that shown in FIG. 3; for example, the path would be twice as wide as that shown to accommodate a data block length of 256 bits.

For substitution sub-module 30, the incoming data bits are preferably divided into 8-bit bytes, each of which is used to address an S-box lookup table. Each S-box contains 256 8-bit entries. To provide maximum parallelism and to finish one round of encryption in one clock cycle, the same S-box is replicated 32 times for an expected data block length of 256 bits. The S-box is replicated 16 or 24 times for expected data block lengths of 128 or 192 bits, respectively.

For shift row sub-module 32, the 256 bits of incoming data (assuming a maximum expected data block length of 256 bits) are preferably divided into four 64 bit chunks, each of which is called a "row" and contains eight bytes. Byte-wise cyclic shits are performed on each row, with the amount of shift determined by the block length through a lookup table, as defined in the AES standard.

For mix column sub-module 34, matrix multiplication is performed on the shifted bytes in accordance with the mix column definition specified in the AES standard, using combinatorial logic; four, six, or eight blocks are used for data block lengths of 128, 192, or 256 bits, respectively.

Finally, key addition sub-module 36 exclusive-OR's the mix column output with the sub-keys received from key scheduling module 12, as prescribed by the AES standard, to generate the encrypted output. Sub-module 36 uses 128, 192 or 256 exclusive-OR gates to produce an output of 128, 192 or 256 bits, respectively.

Maximum parallel key scheduling module 12 has a data path wide enough to accommodate the maximum expected key length. Sub-keys are generated on the fly, in one clock cycle and in parallel with the encryption module. Key scheduling module 12 is arranged to accommodate the different key and block lengths allowed by the Rijndael algorithm or the AES standard, as necessary. The Rijndael algorithm allows block lengths and key lengths of 128, 192 and 256 bits, while the ABS standard limits the block length to 128 bits. For the former case, the key scheduling module 12 is arranged to accommodate the nine different key length and block length combinations, and operates as defined in the Rijndael algorithm. For the latter case, only three combinations must be accommodated, with operation of the key scheduling module defined in the AES standard.

The present architecture can support a chosen combination of key-length k and data block length N, which may require differing numbers of key schedule iterations and round transformations. As noted above, one round transformation per clock cycle is required. Consequently, the speed of the key-scheduling process must be adapted as k and N change. Depending on the parameter values, it may be necessary to complete 0, 1 or 2 key scheduling iterations per clock cycle to keep up with 1 round transformation per clock cycle. For example, when 256 bit data blocks and 128 bit sub-keys (N=256, k=128), then 2 key schedule iterations are needed for each data block. Non-integral rates can also occur: for example, if N=128 and k=192, 1.5 key schedule iterations are required per data block.

Figure 4A:
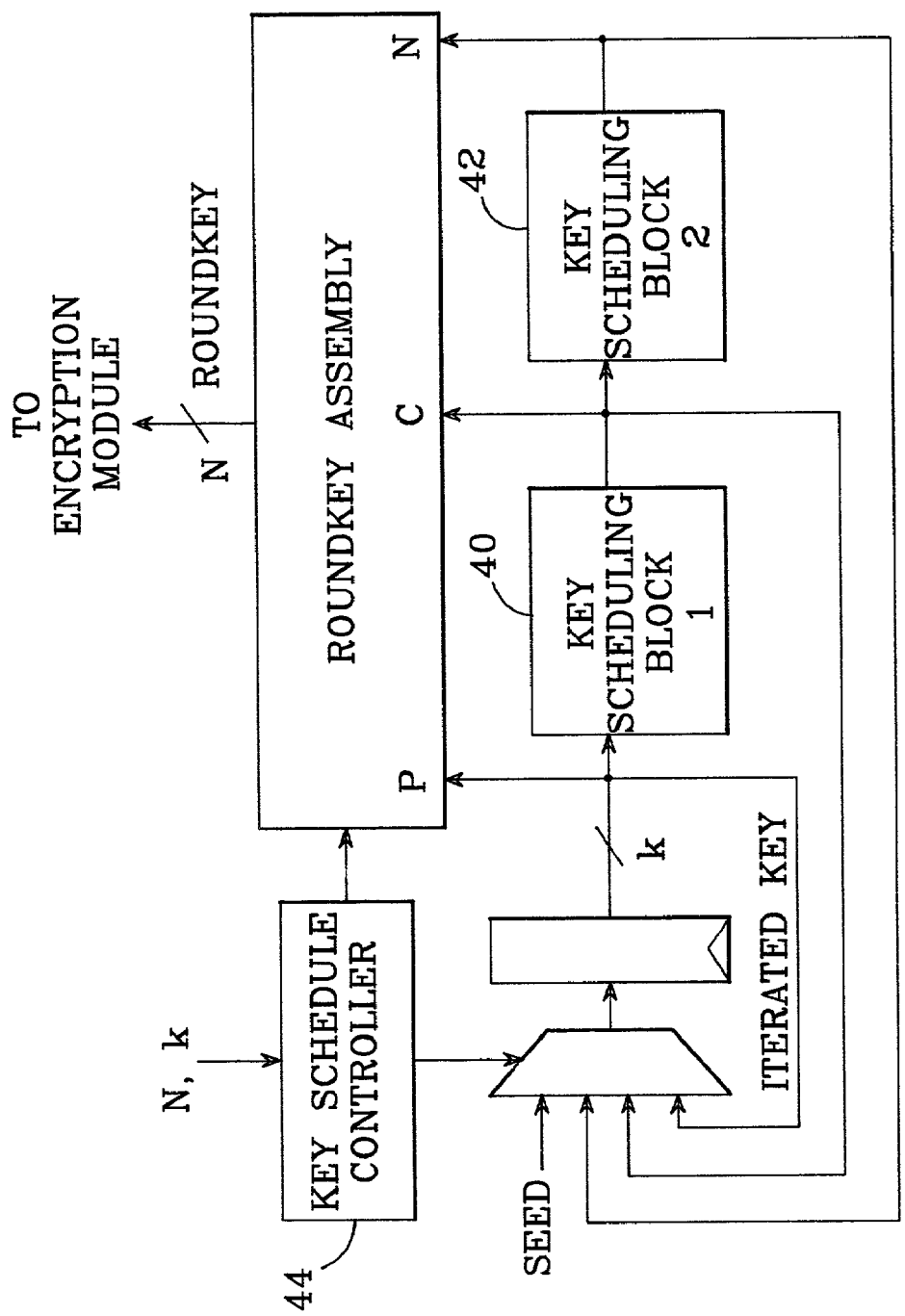
FIG. 4a is a block diagram of a key scheduling architecture as might be used with an AES architecture in accordance with the present invention, which accommodates data block lengths of 128, 192 or 256 bits.

One key scheduling architecture capable of accommodating these combinations is shown in FIG. 4a. Key scheduling module 12 has to provide one N-bit roundkey per clock cycle to encryption module 10. The roundkey is constructed out of k-bit sub-keys. When N is larger than k, multiple sub-keys are required within one clock cycle. The use of two key scheduling blocks 40 and 42 allow evaluation of two iterations of the key scheduling. The N-bit roundkey is assembled out of k-bit sub-keys P, C, and N, produced by the previous, current, and next key schedule iterations. Assembly of the roundkey is under the control of a key schedule controller 44. Controller 44 also steers the pace of the key schedule iterations by selecting which sub-key is used as iterated key: when the P key is selected, the key schedule does not advance. When the C key is selected, one iteration per clock cycle is taken, and when the N sub-key is selected, two iterations are taken per clock cycle.

Figure 4B:
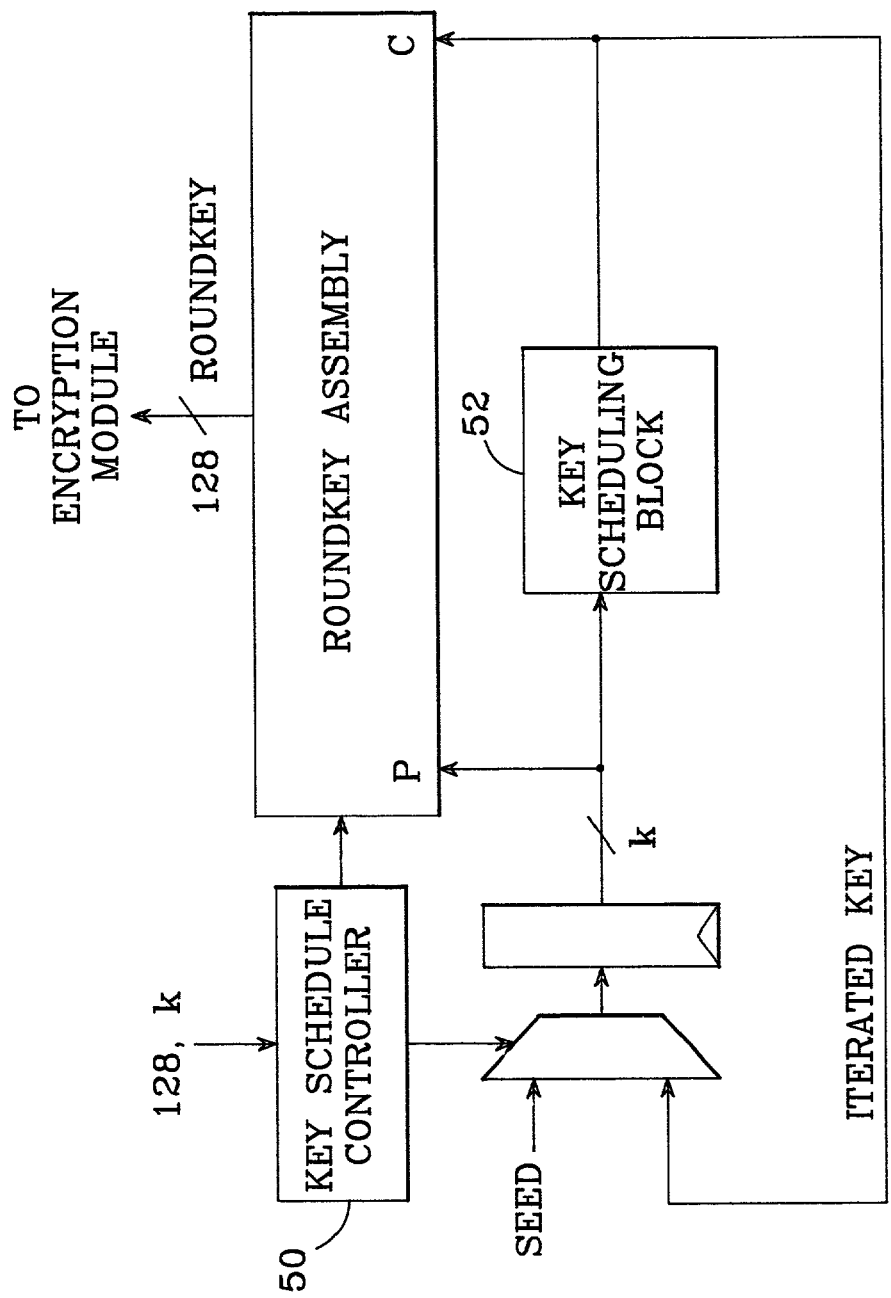
FIG. 4b is an alternative embodiment of a key scheduling architecture as might be used with an AES architecture in accordance with the present invention, which accommodates a data block length of 128 bits.

A simplified key scheduling architecture may be used when only three key and block length combinations must be accommodated; such an architecture is shown in FIG. 4b. Here, only one key scheduling block 52 is required to produce the 128 bit roundkey required by the encryption module.

Figure 5:
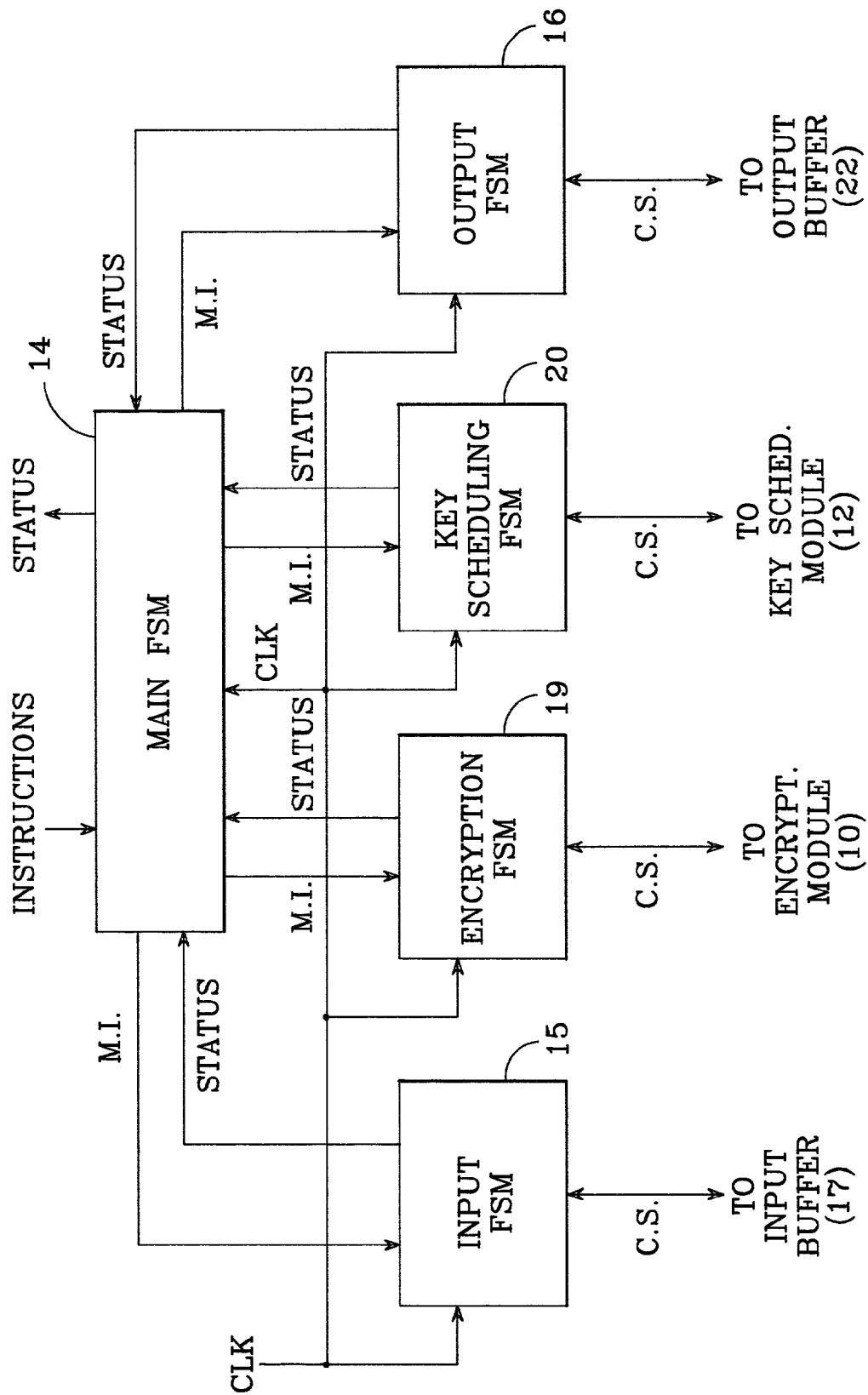
FIG. 5 is a block diagram of a hierarchical distributed control scheme as might be used with an AES architecture in accordance with the present invention.

As noted above, controller 14 is preferably part of a hierarchical distributed control scheme comprising communicating finite state machines (FSMs); this avoids having the controller logic in the critical path, which might slow down the system. Such a control scheme is shown in FIG. 5: main FSM 14 receives instructions from and provides status to the outside world, and decomposes the instructions into detailed micro instructions (M.I.) for the different local FSMs, such as input FSM 15, encryption FSM 19, key scheduling FSM 20, and output FSM 18. The local FSMs provide control signals (C.S.) to their respective modules, and provide status back to the main FSM. Each FSM preferably operates off of a single clock (CLK). This approach has the advantage that each of the FSMs can be kept small, and thus high speed.

Note that the implementations of the control scheme, key scheduling module, and encryption module shown above are merely exemplary. Other designs could be used to implement these functions in accordance with the definitions given in the AES standard, as long as the encryption and key scheduling modules are made maximum parallel, and the architecture can implement one round of the AES algorithm in one clock cycle.

Figure 6A:
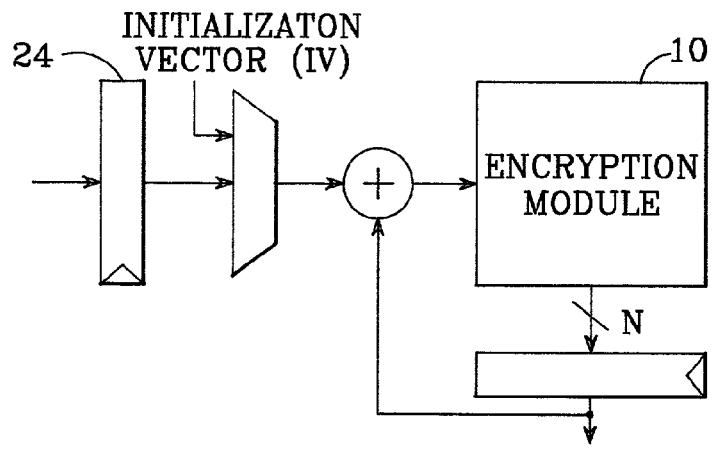
FIGS. 6a–6c illustrate the operation of the present AES architecture in a three different feedback modes of operation.
Figure 6B:
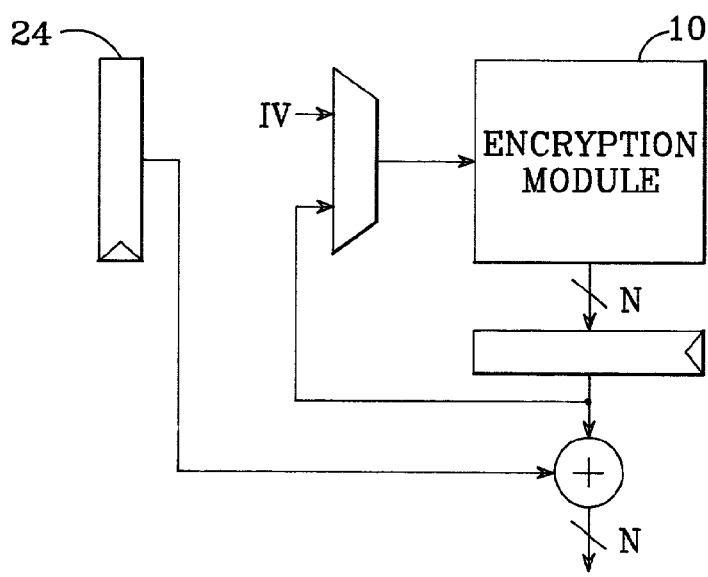
Figure 6C:
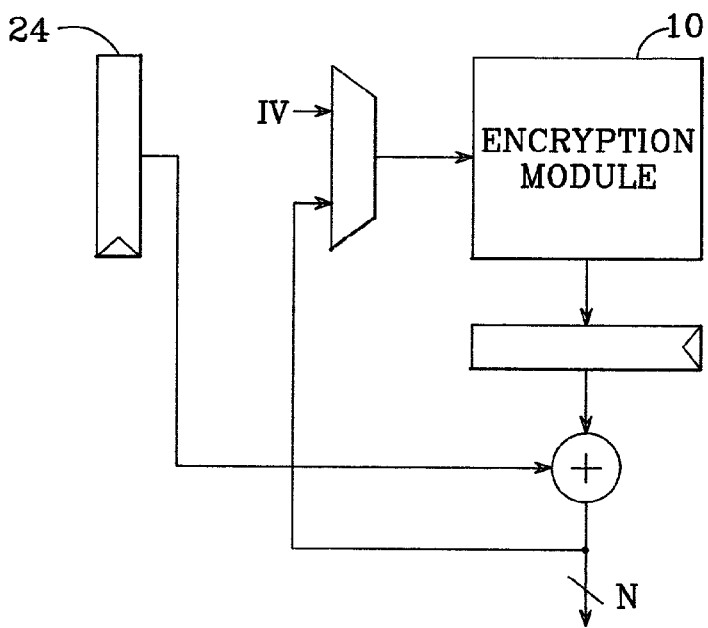

As noted above, the present AES architecture can be used with one of the feedback modes of operation. This is illustrated in FIGS. 6a–6c, which shows only circuitry immediately around encryption module 10. In FIG. 2, the architecture is arranged to implement the electronic code book (ECB) mode of operation. In FIG. 6a, the Cipher Block Chaining (CBC) feedback mode of operation is implemented between register 24 and encryption module 10. In FIG. 6b, the Output Feedback (OFB) mode of operation is illustrated, while in FIG. 6c, the Cipher Feedback (CFB) feedback mode is shown. Other feedback modes may be accommodated in a similar fashion.

While particular embodiments of the invention have been shown and described, numerous variations and alternate embodiments will occur to those skilled in the art. Accordingly, it is intended that the invention be limited only in terms of the appended claims.

I claim:

1. An advanced encryption standard (AES) architecture which provides high throughput and low latency, comprising:
   a maximum parallel encryption circuit that receives a plurality of data bytes to be encrypted and implements one round of the AES algorithm in one clock cycle;
   a maximum parallel key scheduling circuit that generates sub-keys in one clock cycle in parallel with said maximum parallel encryption circuit, said sub-keys provided to said maximum parallel encryption circuit; and
   a controller that controls the operation of said maximum parallel encryption and key scheduling circuits such that said AES architecture performs one round of the AES algorithm in one clock cycle;
   wherein said AES architecture employs a chosen key-length k and a data-block length m, said maximum parallel key scheduling circuit comprising:
   a first key scheduling sub-circuit that receives a previously-generated sub-key and generates a current sub-key;
   a second key scheduling sub-circuit that receives the current sub-key and generates a next sub-key; and
   a roundkey assembly sub-circuit which receives said previously-generated sub-key, said current sub-key, said next sub-key and which assembles an m-bit roundkey from said previously-generated sub-key, said current sub-key, and said next sub-key, and provides said roundkey to said maximum parallel encryption circuit.

2. An advanced encryption standard (AES) architecture which provides high throughput and low latency, comprising:
   a maximum parallel encryption circuit that receives a plurality of data bytes to be encrypted and implements one round of the AES algorithm in one clock cycle;
   a maximum parallel key scheduling circuit that generates sub-keys in one clock cycle in parallel with said maximum parallel encryption circuit, said sub-keys provided to said maximum parallel encryption circuit; and
   a controller that controls the operation of said maximum parallel encryption and key scheduling circuits such that said AES architecture performs one round of the AES algorithm in one clock cycle;
   wherein said AES architecture implements the AES standard with at least 128 bit data-blocks and a chosen key-length k, said maximum parallel key scheduling circuit comprising:
   a key scheduling sub-module arranged to receive a previously-generated sub-key and to generate a current sub-key; and
   a roundkey assembly sub-circuit which receives said previously-generated sub-key and said current sub-key and assembles an at least 128-bit roundkey from said previously-generated sub-key and said current sub-key, said at least 128-bit roundkey provided to said maximum parallel encryption circuit.

3. The AES architecture of claim 2, further comprising:
   an asynchronous input buffer that receives data bytes to be encrypted, to buffers a plurality of said data bytes in parallel, and provides parallel data bytes to said maximum parallel encryption circuit; and
   an asynchronous output buffer that receives an output of said maximum parallel encryption circuit and outputs encrypted data bytes to an output bus.

4. The AES architecture of claim 3, wherein said maximum parallel encryption circuit comprises:
   a substitution sub-circuit comprising substitution blocks which are replicated as needed to receive all of said parallel data bytes from said asynchronous input buffer simultaneously;
   a shift row sub-circuit which receives the outputs of said substitution sub-circuit;
   a mix column sub-circuit which receives the outputs of said shift row sub-circuit; and
   a key addition sub-circuit that receives and combines the outputs of said mix column sub-circuit and said sub-keys from said maximum parallel key scheduling circuit, and provides the results at an output, said output being the output of said maximum parallel encryption circuit.

5. The AES architecture of claim 4, wherein said maximum parallel encryption and key scheduling circuits are implemented exclusively with combinatorial logic.

6. The ABS architecture of claim 3, wherein said controller is implemented with a hierarchical distributed control scheme comprising communicating finite state machines (FSMs), comprising:
   a main FSM; and
   local FSMs which are controlled by said main FSM, said local FSMs comprising:
   a maximum parallel encryption circuit FSM which controls said maximum parallel encryption circuit;
   a key scheduling circuit FSM which controls said key scheduling circuit;
   an input buffer FSM which controls said asynchronous input buffer; and
   an output buffer FSM which controls said asynchronous output buffer.

7. The AES architecture of claim 2, wherein said controller is implemented with a hierarchical distributed control scheme comprising communicating finite state machines (FSMs).

8. The AES architecture of claim 2, wherein said AES architecture implements a Rijndael algorithm with a data-blocks length of 128, 192 or 256 bits and a key-length of 128, 192 or 256 bits.

9. The AES architecture of claim 2, wherein said AES architecture implements the AES standard with a data-block length of 128 bits and a key-length of 128, 192 or 256 bits.

10. The AES architecture of claim 2, wherein said AES architecture implements the electronic code book (ECB) mode of operation.

11. The AES architecture of claim 2, wherein said AES architecture implements a feedback mode of operation.

12. The architecture of claim 2, wherein:
a said maximum parallel encryption circuit receives the output of an asynchronous input buffer and implements one round of the AES algorithm in one clock cycle;
wherein said controller is a hierarchical distributed control scheme comprising communicating finite state machines (FSMs).

13. The AES architecture of claim 12, wherein said maximum parallel encryption circuit comprises:
a substitution sub-circuit comprising substitution blocks which are replicated as needed to receive all of said parallel data bytes from said asynchronous input buffer simultaneously;
a shift row sub-circuit which receives the outputs of said substitution sub-circuit;
a mix column sub-circuit which receives the 10 outputs of said shift row sub-circuit; and
a key addition sub-circuit that receives and combines the outputs of said mix column sub-circuit and said sub-keys from said maximum parallel key scheduling circuit, and provides the results at an output, said output being the output of said maximum parallel encryption circuit;
each of said maximum parallel encryption module sub-circuits implemented exclusively with combinatorial logic.

14. The AES architecture of claim 12, wherein said communicating FSMs comprise:
a main FSM; and
local FSMs which are controlled by said main FSM, 5 said local FSMs comprising:
a maximum parallel encryption circuit FSM which controls said maximum parallel circuit module;
a key scheduling circuit FSM which controls said key scheduling circuit;
an input buffer FSM which controls said asynchronous input buffer; and
an output buffer FSM which controls said asynchronous output buffer.

15. An advanced encryption system (AES) architecture which provides high throughput and low latency, comprising:
an asynchronous input buffer that receives data bytes to be encrypted, buffers a plurality of said data bytes in parallel, and provides said parallel data bytes at an output;
a maximum parallel encryption circuit that receives the output of said asynchronous input buffer and implements one round of the AES algorithm in one clock cycle;
a maximum parallel key scheduling circuit that generates sub-keys in one clock cycle in parallel with said maximum parallel encryption circuit;
an asynchronous output buffer that receives the output of said maximum parallel encryption circuit and outputs said encrypted data bytes to an output bus; and
a controller that controls the operation of said maximum parallel encryption and key scheduling circuits such that said AES architecture performs one round of the AES algorithm in one clock cycle;
wherein said controller is a hierarchical distributed control scheme comprising communicate finite state machines (FSMs);
wherein said AES architecture employs a chosen key-length k and a data-block length m, said maximum parallel key scheduling circuit comprising:
a first key scheduling sub-circuit that receives a previously-generated sub-key and generates a current sub-key;
a second key scheduling sub-circuit that receives the current sub-key and generates a next sub-key; and
a roundkey assembly sub-circuit which receives said previously-generated sub-key, said current sub-key, said next sub-key and which assembles a m-bit roundkey from said previously generated sub-key, said current sub-key, and said next sub-key, and provides said roundkey to said maximum parallel encryption circuit.

16. An advanced encryption system (AES) architecture which provides high throughput and low latency, comprising:
an asynchronous input buffer that receives data bytes to be encrypted, buffers a plurality of said data bytes in parallel, and provides said parallel data bytes at an output;
a maximum parallel encryption circuit that receives the output of said asynchronous input buffer and implements one round of the AES algorithm in one clock cycle;
a maximum parallel key scheduling circuit that generates sub-keys in one clock cycle in parallel with said maximum parallel encryption circuit;
an asynchronous output buffer that receives the output of said maximum parallel encryption circuit and outputs said encrypted data bytes to an output bus; and
a controller that controls the operation of said maximum parallel encryption and key scheduling circuits such that said AES architecture performs one round of the AES algorithm in one clock cycle;
wherein said controller is a hierarchical distributed control scheme comprising communicating finite state machines (FSMs);
wherein said AES architecture implements the AES standard with at least 128 bit data-blocks and a chosen key-length k, said key scheduling module comprising:
a key scheduling sub-circuit that receives the previously-generated sub-key and generates the current sub-key; and
a roundkey assembly sub-circuit which receives said previously-generated sub-key and said current sub-key and assembles an at least 128-bit roundkey from said previously-generated sub-key and said current sub-key, said at least 128-bit roundkey provided to said maximum parallel encryption circuit.

17. The AES architecture of claim 16, wherein said AES architecture implements the a Rijndael algorithm with a data-blocks length of 128, 192 or 256 bits and a key-length of 128, 192 or 256 bits.

18. The AES architecture of claim 16, wherein said AES architecture implements the AES standard with a data-block length of 128 bits and a key-length of 128, 192 or 256 bits.

19. The AES architecture of claim 16, wherein said AES architecture implements the electronic code book (ECB) mode of operation.

20. The AES architecture of claim 16, wherein said AES architecture implements a feedback mode of operation.

21. The AES architecture of claim 20, wherein said AES architecture implements the Cipher Block Chaining (CBC) feedback mode of operation.

22. The AES architecture of claim 20, wherein said AES architecture implements the Cipher Feedback (CFB) feedback mode of operation.

23. The AES architecture of claim 20, wherein said AES architecture implements the Output Feedback (OFB) feedback mode of operation.

* * * * *